United States Patent Office 3,806,477
Patented Apr. 23, 1974

3,806,477
PASTES FOR USE IN HARDENING PUTTIES CONTAINING ORGANIC PEROXIDES AND PROCESS FOR PREPARING SAME
Hans Jaspers, Diepenveen, and Reinder Torenbeek, Twello, Netherlands, assignors to Koninklijke Industrieele Maatschappij Noury & van der Lande N.V., Deventer, Netherlands
No Drawing. Filed Nov. 1, 1971, Ser. No. 194,700
Claims priority, application Netherlands, Nov. 2, 1970, 7015982
Int. Cl. C08b 21/24; C08f 29/10
U.S. Cl. 260—17 R         8 Claims

ABSTRACT OF THE DISCLOSURE

A composition in the form of a paste, for hardening putties, comprising a ketone peroxide, a phlegmatizer, a gel-forming colloid, and an insoluble synthetic organic polymer or copolymer. Preferably, the polymer or copolymer has a particle size of $\leq 300\mu$. The gel-forming colloid comprises a cellulose derivative, and one or more coloring agents, pigments, sequestering agents for antioxidants may be present. The composition is conveniently packaged in a collapsible tube.

---

This invention relates to compositions in the form of pastes containing ketone peroxides, which are capable of hardening putty-like materials. These pastes are especially useful as they can be packaged in, and dispensed as required from, collapsible tubes.

Heretofore, putties based upon unsaturated polyesters have been hardened e.g. by the admixture of cyclohexanone peroxides. In order to obtain an accurate measuring or dosage of the peroxide hardener into the putty to be hardened and their mixture together, these peroxides are not usually added as such, but as a paste which is packaged in a conventional collapsible tube, the dosage being controlled by squeezing out the paste to a given length from the tube. These pastes consist of a mixture of cyclohexanone peroxides in suitable phlegmatizers. Suitable phlegmatizers are e.g. phthalate plasticizers, such as dibutyl phthalate, polymeric plasticizers, such as polyethylene glycol phthalate, and water.

These pastes have the disadvantage that the cyclohexanone peroxides do not gel and harden the putty fast enough. Consequently, there is a considerable difference in time between the addition of the paste and the moment at which the resin is hardened sufficiently to be fashioned further, and this is economically unattractive.

In addition to cyclohexanone peroxides, other ketone peroxides are known, which are derived from aliphatic ketones having a carbon chain of 3-10 C-atoms, e.g. methyl ethyl ketone, methyl isobutyl ketone, methyl amyl ketone, $\beta$-diketones having 5-10 c-atoms, e.g. acetylacetone, and hydroxy ketones having 3-10 C-atoms, e.g. diacetone alcohol. These peroxides cause faster jellification and hardening of unsaturated polyester resins that cyclohexanone peroxides in paste form. However, these other peroxides have not previously been incorporated into pastes, and, for this reason, these peroxides have been marketed as solutions in the usual phlegmatizers.

British Pat. No. 1,092,963 describes a formulation of a peroxide derived from acetyl-acetone, consisting of the peroxide, an organic liquid having a considerable solubility in water and, if desired, water. Organic liquids which are mentioned include alkanols, glycols, ethers, ketones, esters, heterocyclic amides and heterocyclic alcohols. In order to increase the viscosity, thickening agents may be incorporated in the formulations. By the addition of these thickening agents, a paste may be obtained which, however, is granular and decomposes both physically by way of segregation and chemically with the formation of gas.

Consequently, there is still a need in technology for a homogeneous paste which is dosable or measurable from a conventional collapsible tube and which contains a ketone peroxide, and which causes a faster jellification and hardening of unsaturated polyester resin putties than the materials now known and available for this purpose.

It has now been found in accordance with the present invention that such a paste may be obtained by mixing a ketone peroxide, a phlegmatizer and, if desired, water with such a quantity of a gel-forming colloid and an insoluble, synthetic, organic polymer or copolymer that a homogeneous paste is obtained.

In principle, any synthetic organic polymers or copolymers which are insoluble may be incorporated into the paste. However, the polymers or copolymers should be pulverulent or capable of being ground to powders having a particle-size $\leq 300\mu$. The preferred polymers or copolymers are those of vinyl monomers such as polyvinyl chloride, polyethylene, polystyrene and polyacrylates, as these polymers are readily available on the market as powders with the particle-size desired. In addition, polycarbonates, polyesters and copolymers thereof may be used. The quantities may vary over wide limits. Quantities from 5% to 60% by weight, preferably from 15% to 40% by weight, calculated on the total weight of the paste, are usually sufficient.

The gel-forming colloids preferably used include cellulose ethers, such as methyl celluose, ethyl cellulose, carboxymethyl celluose, hydroxy ethyl cellulose, hydroxy propyl cellulose, ethyl hydroxy butyl cellulose and ethyl hydroxy ethyl cellulose; cellulose esters such as cellulose acetate; and other cellulose derivatives such as cellulose acetobutyrate.

Furthermore, polyvinyl alcohol, polyvinyl acetate, polyvinyl pyrrolidone, silica aerogels and resins soluble in water and polar solvents, such as carbovinyl polymers, may also be incorporated in the pastes.

The gel-forming colloids may be incorporated in the pastes in quantities from 0.1% to 10% by weight, preferably from 1% to 5% by weight, calculateed on the total weight of the paste.

If desired, coloring agents or pigments which are inert with respect to the peroxides incorporated therein, e.g. benzidine yellow, perylene-tetracarboxylic acid pigment and phthalocyanine coloring agents, may be included in the paste and, if desired, also sequestering agents and anti-oxidants.

The pastes may be prepared with the aid of the usual apparatus such as Nauta-mixers or planetary mixers.

In principle, all ketone peroxides may be formulated as pastes according to this invention, particularly, however, acetyl acetone peroxide, methyl ethyl ketone peroxide and methyl isobutyl ketone peroxide.

The preferred phlegmatizers include phthalic plasticizers such as dimethyl, diethyl, dibutyl and butylbenzyl phthalate and other esters with a low volatility such as tricresyl phosphate, triethyl phosphate, dibutyl fumarate, dioctyl adipate and polyglycol phthalate. Furthermore, polyhydroxy compounds including glycerol and glycols such as ethylene glycol, propylene glycol, diethylene glycol, dipropylene glycol and the ethers, esters and ether esters derived therefrom and also polyethylene glycol,- polypropylene glycol and also ethers, esters, or ether esters derived therefrom may be used.

Preferred solvents include water, ketones, alcohols, esters and other inert solvents which are miscible with the phlegmatizers chosen and which dissolve the peroxide, but not the polymer used.

The putties to be hardened with the pastes according to this invention may be used for filling up dents in coachwork, pointing tiles, filling holes and cracks in floors and walls, and for filling and flattening rough surfaces. Hardening usually takes place in the presence of accelerators. Preferably, however, a cobalt accelerator, such as cobalt naphthenate, cobalt isooctoate and cobalt iso-nonanoate, is selected.

The following examples will illustrate the invention.

EXAMPLE I

In a stainless steel conical screw mixer of 2 liters capacity, 1320 g. of a peroxide solution containing, in percent by weight:

| | Percent |
|---|---|
| Acetyl acetone peroxide | 30 |
| Diacetone alcohol [1] | 45 |
| Diethylene glycol [1] | 8 |
| Water [1] | 17 |

[1] Phlegmatizer.

where mixed with stirring with 50 g. of hydroxy-ethyl cellulose having a substitution degree of 2.5 and an average number of moles of ethylene oxide per anhydro-glucose unit of 2.5 (as thickening agent), and with 630 g. of polyvinyl chloride having a particle-size $<40\mu$.

After a few minutes, the mixture started to thicken and then the stirring was stopped.

A homogeneous paste was obtained, having an active oxygen-content of 2.44%. After storage for 60 days at room temperature, no external changes could be observed and the active oxygen-content amounted to 2.38%.

EXAMPLE II

In a stainless steel conical screw mixer of 2 liters capacity, 1200 g. of a 50% by weight solution of methyl ethyl ketone peroxide in dimethyl phthalate were mixed with 80 g. of colloidal silicon oxide as thickening agent and 720 g. of polyvinyl chloride having a particle size $<200\mu$. After stirring intensively for 10 minutes, a homogeneous paste was obtained having an active oxygen-content of 5.59%. After storage for 60 days at room temperature, this content amounted to 5.42%.

EXAMPLE III

In a stainless steel planetary mixer of 5 liters capacity, 2220 g. of a peroxide solution containing, in percent by weight:

| | Percent |
|---|---|
| Acetyl acetone peroxide | 27.5 |
| Diacetone alcohol [1] | 40.0 |
| Diethylene glycol [1] | 6.5 |
| 1,2-propane diol [1] | 11.0 |
| Water [1] | 15.0 |

[1] Phlegmatizer.

were mixed with 60 g. of hydroxy butyl methyl ether of celluolse as a thickening agent, and 720 g. of polyethylene having a particle-size between 100 and $200\mu$.

A homogeneous paste was obtained having an active oxygen-content of 2.42%. After storage for 60 days at room temperature, this content amounted to 2.31%.

EXAMPLE IV 500 g. of the paste prepared according to Example III were mixed intimately with 0.375 g. of a perylene tetracarboxylic acid pigment (PV Echt Rot B). The homogeneous red paste thus obtained had an active oxygen-content of 2.41%. After storage for 60 days at room temperature, this content amounted to 2.34%.

In an analogous way, 500 g. of the paste prepared according to Example III were mixed with 1.25 g. of a benzidine yellow derivative (PV Gelb H 10 G). The yellow-colored paste had an active oxygen-content of 2.39%. After storage for 60 days at room temperature, this content amounted to 2.36%.

EXAMPLE V

In a stainless steel conical screw mixer, 1400 g. of a peroxide solution containing, in percent by weight:

| | Percent |
|---|---|
| Cyclohexanone peroxide | 25 |
| Methyl cyclohexanone peroxide | 27.5 |
| Triethyl phosphate as phlegmatizer | 42.5 | were mixed intensively with 100 g. of colloidal silicon oxide and 500 g. of pulverulent polyethylene having a molecular weight of about 2000. A homogeneous paste was obtained having an active oxygen-content of 4.44%. After storage for 60 days at room temperature, no external change was observed and the active oxygen-content amounted to 4.28%.

EXAMPLE VI 2 g. of a solution of cobalt-2-ethyl-hexoate in white spirit (Co-content 10%) were added to 250 g. of a putty containing, in percent by weight:

| | Percent |
|---|---|
| Unsaturated polyester resin | 40 |
| Chalk | 38 |
| Talc | 18 |
| Titanium dioxide | 2.8 |
| Colloidal silica | 1.2 | and then the putty was hardened at 20° C. with 2 g. of cyclohexanone peroxide paste containing equal amounts by weight of peroxide and dibutyl phthalate. The active oxygen-content of the paste amounted to 6.5%. Consequently 0.13 g. of active oxygen was measured into the paste.

In an analogous way, 250 g. of the same putty were hardened with peroxide pastes according to Examples I, II and V. The quantity of paste added each time was such that 0.13 g. of active oxygen was measured into the putty.

The gel time of the unsaturated polyester resin was measured and also the Shore A hardness 85 according to NEN 5601. The publication "NEN 5601" is a standard determination of hardness in articles of vulcanized rubber with the aid of a durometer. This Dutch norm of the "Nederlands Normalisatie-instituut" corresponds to the American standard ASTM D 676–59 T.

The results obtained are tabulated hereafter:

| | Time in minutes at 20° C. | |
|---|---|---|
| Peroxide paste | Jellification | Hardness |
| Cyclohexanone peroxide | 16 | 42 |
| Methyl ethyl ketone peroxide (according to Ex. II) | 10 | 38 |
| Acetyl acetone peroxide (according to Ex. I) | 6 | 18 |
| Cyclohexanone peroxide (according to Ex. V) | 7 | 38 |

What is claimed is:

1. A paste for use in hardening putties consisting essentially of, in approximate parts by weight:
   (a) 10–50 parts of a ketone peroxide;
   (b) 20–70 parts of one or more, plasticizers inert to the ketone peroxide, organic solvents inert to the ketone peroxide or water;
   (c) 0.1–10 parts of a gel-forming colloid selected from the group consisting of cellulose esters and cellulose ethers; and
   (d) 5–60 parts of synthetic organic polymer of an ethylenically unsaturated monomer having a particle size of less than 300 microns which is insoluble in the paste.

2. A composition according to claim 1, wherein a vinyl polymer or copolymer is present.

3. A composition according to claim 2, comprising polyvinyl chloride.

4. A composition according to claim 1, wherein polyethylene is the insoluble polymer present.

5. A composition according to claim 1, containing from 15% to 40% by weight of the polymer or copolymer.

6. A composition according to claim 1, wherein from 1% to 5% by weight of a gel-forming colloid is present.

7. A composition according to claim 1, wherein one or more coloring agents, pigments, sequestering agents or anti-oxidants is/are present.

8. A process for making a paste of the composition of that of claim 1 which comprises mixing together components (a), (b), (c) and (d) to form a homogeneous paste.

References Cited
UNITED STATES PATENTS 2,413,323  4/1941  Hills _____ 260—17 R
2,461,900  4/1944  Johnson _____ 260—17 R WILLIAM H. SHORT, Primary Examiner
P. F. PFLKOSKY, Assistant Examiner U.S. Cl. X.R.
260—610 S C K